Aug. 26, 1930.  W. A. TURBAYNE  1,774,304

DYNAMO ELECTRIC MACHINE

Filed Jan. 5, 1928  2 Sheets-Sheet 1

Witness:
Chas. R. Koursh

Inventor,
William A. Turbayne,
George Bayard Jones. Atty.

Aug. 26, 1930.　　　W. A. TURBAYNE　　　1,774,304

DYNAMO ELECTRIC MACHINE

Filed Jan. 5, 1928　　　2 Sheets-Sheet 2

Witness:　　　　　　　Inventor,
Chas. R. Koursh　　　William A. Turbayne,
　　　　　　　George Bayard Jones, Atty.

Patented Aug. 26, 1930

1,774,304

UNITED STATES PATENT OFFICE

WILLIAM A. TURBAYNE, OF CLEVELAND, OHIO, ASSIGNOR TO HOLLUP CORPORATION, A CORPORATION OF ILLINOIS

DYNAMO-ELECTRIC MACHINE

Application filed January 5, 1928. Serial No. 244,628.

This invention relates to improvements in dynamo electric machines and more particularly to the class of direct current, variable voltage generators, such as are employed, for example, in electric arc welding operations or for supplying projector arc lamps, and in which variations in armature current are accompanied by inverse variations in terminal voltage so that the energy expended in the load circuit will be automatically held within certain predetermined desired values.

In existing generators of this type it is common practice to produce the inverse voltage—current variations by means of a differential or "bucking" series winding, carrying the load current, which opposes the action of the effective voltage producing windings, these latter as a rule being supplied wholly or in part, from a separate exciting source.
By reason of the mutual inductive action between these opposing windings a damping action results which renders such machines incapable of causing an instantaneous voltage response to load current changes, a condition necessary in maintaining stable operation of a metallic welding arc for instance.

In arc welding operations, therefore, it is the usual practice to stabilize the load circuit by inserting an impedance device therein, consisting of an inductive reactor, a fixed resistor or a combination of both. Such stabilizing devices, by reason of the line losses added thereby, not only cause a noticeable reduction in operating efficiency, but materially increase the cost of equipment by reason of the direct cost of the device itself and also through necessitating the employment of a larger generator of greater voltage capacity than would otherwise be required.
The novel construction incorporated in the proposed new design results in a self regulating generator having high inherent reactance, quick response to arc voltage variations and immediate voltage recovery to substantially normal value upon breaking of the work circuit. Attainment of these qualities in sufficient degree renders such a machine capable of directly supplying a welding arc without requiring additional circuit stabilizing devices or the use of a separate exciting generator or equivalent means. In addition, all the advantages previously attained with an interpole machine, are retained in the new machine with its added functions and advantages.

The objects of the invention are:
To provide a generator which by inherent action will automatically maintain the electrical energy expended in the work circuit within certain desired values.

To provide a generator having a high internal reactance so that immediate, and opposite, pronounced terminal voltage variations will accompany and check variations in current flowing in the work circuit.

To provide means whereby this internal reactance may be inherently modified in a desirable degree, accompanying adjusted variations in the work circuit conditions.

To provide means whereby the adjusted normal open-circuit voltage value will be substantially immediately recovered upon opening the work circuit.

Other objects will be apparent from the description.

The accompanying drawings illustrate one embodiment of the invention, designed for arc welding service. A four pole machine is shown, although it will be understood that any practicable number of poles may be utilized so long as the proper angular relationships are maintained.

Figure 1:
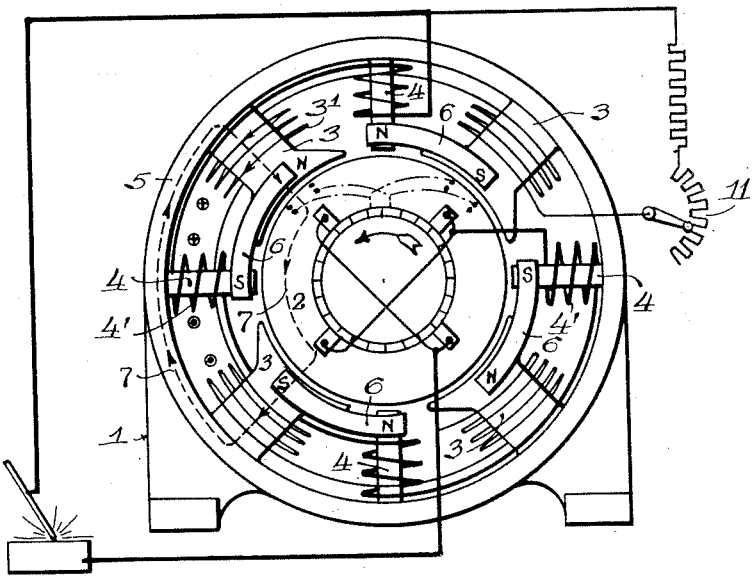
Fig. 1 is a diagram of the generator showing certain working conditions.

The generator 1, is provided with the usual armature 2, supporting the properly disposed armature conductors, main poles 3, equally spaced around the periphery and auxiliary poles 4, spaced midway between the main poles. The magnetic circuit is completed around the circular yoke 5. The main poles 3, are excited by windings 3′ which may either be supplied from the generator itself or from a separate exciting source. The auxiliary poles 4 are provided with windings 4′ connected in series in the work circuit and carrying the full load current.

Figure 6:
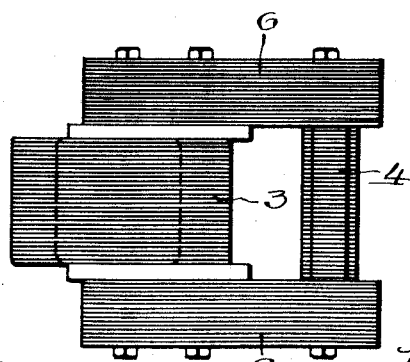
Fig. 6 is a view of the faces of two adjacent pole pieces and connecting bridges.

On either side of the poles 3 and 4, are provided magnetic bridges 6 which preferably are in intimate contact with the auxiliary pole 4, but are separated from the main pole 3 by suitable air gaps or non-magnetic spacers such as brass. These air gaps or spacers are introduced to prevent the complete magnetic short circuiting of the poles 3 and 4 and thereby diverting the magnetic flux from the armature 2 under the lower conditions of excitation, or until the bridges 6 are sufficiently saturated to introduce an effective reluctance in this path. The bridges 6 are preferably located at the sides of the poles as shown in Fig. 6, thereby leaving an air gap over the armature teeth.

The poles 3 and 4 and the bridges 6 should be made from iron or steel laminations insulated and assembled in accordance with present transformer practice. With this arrangement the cross sectional area of the bridging members may be readily varied by adding or removing laminations. Also said bridges may be located between the auxiliary poles and main poles instead of being located at the side thereof and may be adjustable to vary the air gap between said members and the main poles.

The disposition and arrangement of the armature conductors and the location of the brushes on the commutator follow standard generator practice.

Figure 2:
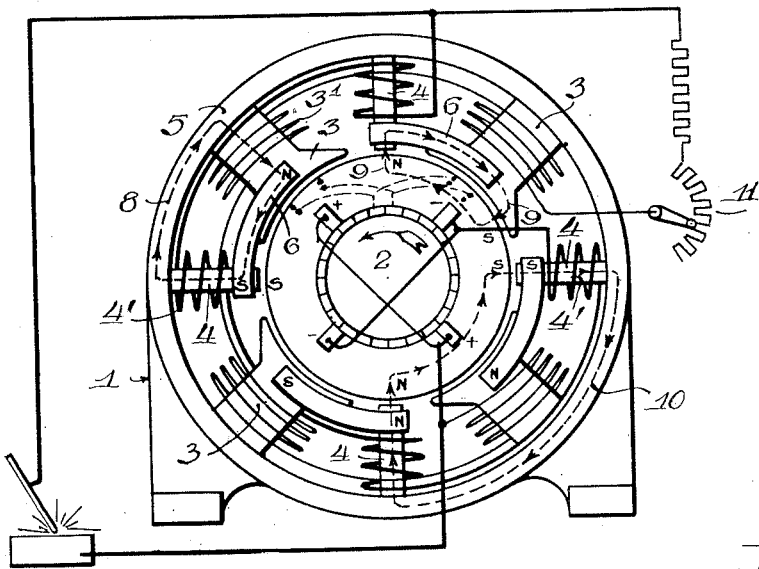
Fig. 2 is a similar diagram showing somewhat different working conditions.

Upon the attainment of an effective rotative speed, the exciting current flowing in coils 3′ will develop magnetic flux in poles 3 in the usual manner, the major portion of which will be projected through the poles 3, armature core and field yoke 5. This flux, having the mean path in each parallel branch of the magnetic structure indicated by broken line 7, will develop the working voltage effective at the machine terminals. A portion of the developed flux, limited in value however by the much greater reluctance of this branch, will pass through a pole 3, magnetic bridge 6, pole 4 and a portion of the yoke 5, having a mean path indicated by the broken line 8. (See Figure 2.) A magnetic flux will be similarly distributed in the other corresponding branches of the magnetic structure.

The value of the total flux and consequent open circuit voltage of the generator will be determined by the value of the exciting current flowing in the coil 3′ and this voltage may be varied or adjusted at will by altering the value of the exciting current in any well known manner as by a field rheostat 11.

Figure 3:
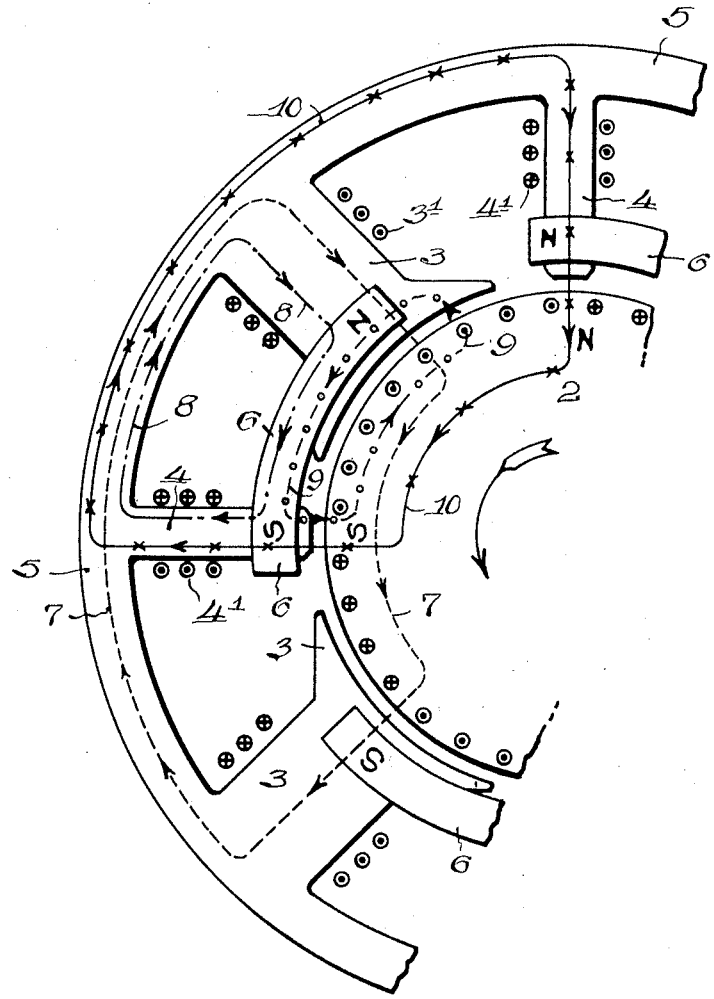
Fig. 3 is an enlarged diagram showing in the one figure a number of different working conditions.

Upon closing the circuit, current will pass around coils 4′, which will act in the same direction as the coil 3′ in circulating magnetic flux around the path 8, which includes a pole 3, bridge 6, pole 4 and a portion of the yoke 5. This flux will be in addition to that originally set up by the action of the coil 3′ and as a result the magnetic density in pole 3 will have been increased, followed by an increase of the magnetic reluctance resulting in a reduction in the effective flux passing into the armature and a lowering of the terminal voltage. At the same time current in the armature conductors will set up a flux having a mean path 9, which acts cumulatively with the current in coil 4′ to increase the flux through the magnetic bridge. This is shown on the adjoining pole group, as in Fig. 2 to avoid confusing the lines, and it is also shown in Fig. 3. The flux 9 also opposes the flux in the forward part of the pole tip 3. The advantage of this arrangement is that the opposing effect is limited to the pole tip and does not affect the main pole 3, but on the contrary the density of the flux in the main pole is increased which insures greater stability in the machine and insures a drooping characteristic by increasing the reluctance. The only flux that is effective in developing voltage is that which crosses the air gap and with the present arrangement said flux is diminished under the forward portion of the main pole.

It will be noted that the current in all field conductors in the space opposite the magnetic bridge 6 flows in the same direction (as indicated) to increase the flux in the local path above mentioned, while in the spaces next adjacent, the currents in the coil windings are in opposition, tending to oppose passage of flux in the yoke portion opposite this space, which action causes a reduction in the magnetic flux in the path 7, through the armature, which assists in the reduction of the working voltage.

Upon the attainment of a certain high value of current through the coil 4′ and armature 2, the bridge 6 will ultimately become saturated and the reluctance of this path indicated by Fig. 3 will have become sufficiently high so that flux will be projected through the poles 4, and through the armature in a mean path indicated by 10, which will act as a commutating flux under heavy load conditions.

The increased density causes an increased reluctance, which in turn reduces the effectiveness of the main coils 3′, thus providing an inherent self regulation. This inherent regulation occurs throughout the entire range of the working load from a minimum to a maximum. At some predetermined value of current, depending on the cross section of the bridging members 6 and other details of design, said bridging members approach saturation, thus increasing the magnetic reluctance of the same in sufficient degree to render them no longer susceptible to the effect of the armature conductors, resulting as stated in the establishment of the magnetic flux along the path 10 from one of the auxiliary poles 4 to the opposite pole 4. (See Figs. 2 and 3.) This magnetic path is established only after the armature cross-magnetizing effect has been overcome, as just explained, the machine now operating as a standard type of interpole machine. In other words the commutating flux is through the auxiliary poles 4 which now function as commutating poles, this flux acting to suppress sparking at the brushes under heavy load conditions as in the ordinary types of interpole machine.

The current range at which the welding is most effectively performed may be adjusted at will by varying the excitation current through the main coils 3' by means of the field rheostat 11 or other suitable device. For example, for light work a welding current of perhaps 50 or 60 amperes may be desired, whereas for heavier welding a current of several hundred amperes may be necessary.

Figures 4, 5:
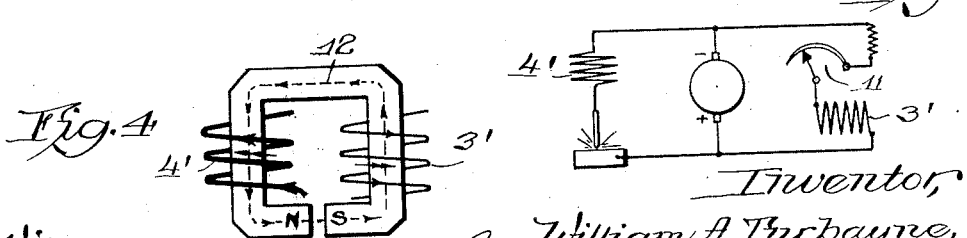
Fig. 4 is a diagram illustrating the effect of two adjacent poles and bridging members.
Fig. 5 is a simplified diagram of the generator and welding circuit.

By virtue of the magnetic bridges 6, a substantially closed magnetic circuit is provided by each pole group such as illustrated diagrammatically in Fig. 4, which insures a high reactance machine. This high reactance is due not only to the auxiliary windings 4', but to the current flowing in the armature conductors, acting in the path 9, substantially embracing the points of maximum armature magnetic potential.

*Modifying the open circuit voltage.*—In the standard machine where an external fixed reactance is used which has to be designed to stabilize the machine at the minimum working currents, such reactance causes an excessive loss when higher currents are employed, this loss possibly running as high as 50%. There is not only an excessive reactance drop, but a great resistance drop as a result of which there is an undue loss of energy and a decided lack of penetration in welding with the heavier currents.

With the present arrangement, in adjusting for different values of welding current by varying the open circuit voltage through alteration of the flux through pole 3, as by modifying the excitation imparted by the winding 3', the magnetic reluctance which affects the local magnetic paths 8 and 9 is varied correspondingly. This variation of reluctance following load adjustments gives an inherent variation in reactance and brings about the very desirable condition of producing a high reactance at the lower welding currents and a lower reactance at the higher welding currents when less reactance is required.

Each pole group comprising poles 3 and 4, yoke 5 and bridges 6 with spacers constitutes a two coil transformer, series coil 4' representing the primary winding and shunt coil 3' the secondary winding. Such a transformer is represented by Fig. 4 indicating a loaded condition during which the cumulative effect of the working current in coil 4' and the exciting current in coil 3', (the current direction through both coils being indicated by the arrows on the conductors) sets up a magnetic flux in the core having the direction indicated also by the arrows on the broken line 12.

A sudden cessation of the current through 4', as by opening the work circuit, results in an immediate collapse or diminution of the flux, providing an instantaneous electromotive-force in both windings, acting in the direction indicated by the double headed arrows. Inasmuch as at this instant the circuit, including 4', is open, all of the energy represented by the released flux must be expended in the winding 3' which, on account of its comparatively larger number of turns, develops an instantaneous high voltage impulse causing the immediate upbuilding of the exciting current flowing therein and a correspondingly quick restoration to normal value, of the effective flux and generator open circuit voltage.

Conversely a sudden short circuit of the machine, as when striking the arc, causes an initial rush of current through 4' and a corresponding large flux through the core in the direction indicated by the arrows on flux path 12 thereby instantaneously developing simultaneously on both windings electro-motive-forces acting in a direction opposite to the double headed arrows. It is apparent this voltage now opposes the current flow in both windings thereby checking the current in the load circuit and causing an immediate reduction in the exciting current, and thereby a corresponding quick reduction in generator voltage.

These actions of course exist in lesser degree throughout minor variations in load current such as accompany the hand manipulation of an arc welding.

What I claim is:

1. A dynamo electric machine comprising main poles and auxiliary poles with magnetic bridges supported by the auxiliary poles and extending to but out of contact with the main poles.

2. A dynamo electric machine having main and auxiliary pole pieces connected by a bridging member, said pole pieces being cumulatively wound.

3. A dynamo electric machine having main and auxiliary pole pieces connected by a bridging member, said pole pieces being cumulatively wound with a single winding on said main pole pieces.

4. A dynamo electric machine comprising main poles and auxiliary poles, each pair being wound cumulatively to form a transformer with a shunt winding on the main pole and a series winding on the auxiliary pole whereby a heavy rush of current in the series coil is checked by the high reactance of the latter and a reduction of exciting current is brought about in the shunt winding.

5. A dynamo electric machine comprising main poles and auxiliary poles, a shunt winding on each main pole and a series winding on each auxiliary pole, each pair of main and auxiliary poles being cumulatively wound whereby increase of current in each series winding increases the flux density in the corresponding main pole thereby rendering less effective said shunt winding thereon.

In testimony whereof, I have subscribed my name.

WILLIAM A. TURBAYNE.